United States Patent Office 3,397,063
Patented Aug. 13, 1968

3,397,063
BEVERAGE MIX AND PROCESS
Paul O. Carlson, Hickory Corners, Mich., and Elmer W. Michael, Evansville, Ind., assignors to General Foods Corporation, White Plains, N.Y., a corporation of Delaware
No Drawing. Continuation of application Ser. No. 452,012, Apr. 29, 1965. This application Aug. 1, 1966, Ser. No. 569,111
4 Claims. (Cl. 99—78)

ABSTRACT OF THE DISCLOSURE

A new and improved fruit flavored, beverage drink in the form of a powder adapted to be reconstituted in cold water, has been prepared. The surface of the sugar granules, sugar being the major weight constituent of the blend, have been uniformly impregnated with a coloring agent and a desiccating agent without destroying their crystalline structure.

---

This application is a continuation of our copending patent application Ser. No. 452,012, filed Apr. 29, 1965, for Food Product and Process (now abandoned) which copending application was a continuation-in-part of our copending patent application, Ser. No. 209,797, filed July 13, 1962, for "Food Product and Process" (now abandoned).

This invention relates to a new and improved beverage composition and to a method of manufacturing same. More particularly, the invention is concerned with the manufacture of a beverage preparation typically of the fruit flavored type and like that disclosed in U.S. Patent No. 3,023,106 to Common, issued Feb. 27, 1962.

In the manufacture of a powdered beverage composition adapted to be reconstituted in cold water, it is desirable to incorporate into such composition a flavoring material consisting essentially of an emulsion of discrete droplets of a flavoring oil such as orange oil in a matrix of amorphous sugar solids such as corn syrup solids. Manufacture of such a particulate flavoring material is described in U.S. Patents 2,809,895 and 3,041,180 to Swisher, issued Oct. 15, 1957, and June 26, 1962, respectively. According to these patents, the flavoring material may be produced by preparing an emulsion of oil and a corn sugar syrup having a moisture content of from 3% to 8%, dispersing the flavor oil in the matrix material through the use of a suitable dispersant, converting the emulsion to a solidified state and subdividing the solidified emulsion into a particulate free-flowing granular consistency. Preferably, although not necessarily, the flavoring oil is removed from the surface of the material through the use of a suitable solvent such as ethyl alcohol which may also be refrigerated and serve as a means for solidifying extruded filaments of the liquid emulsion as described in the latter of the aforesaid Swisher patents.

It is believed critical that an amorphous sugar be employed as the matrix material for this solidified emulsion so as to avoid crystallinity which is attributed by Swisher to an instability of the flavoring oil; hence the employment of an amorphous sugar matrix. However, amorphous sugar solids like corn syrup are quite hygroscopic and call for the employment of the most sophisticated packaging techniques wherein the presence of moisture must be obviated to the maximum practical extent.

In the preparation of a beverage mix containing such a flavoring composition, it is usually desired to furnish the powderous material in a color identifiable with the flavor of the encapsulated oil. Thus, in the case of an orange oil having a distinctive orange flavor, it will be desired to color the remaining constituents of the beverage composition with an orange color. Since the major constituent by weight of the beverage composition is usually a sugar such as sucrose, this will call for wetting the sugar with the food color in solution under conditions which call for the uniform distribution of the coloring solution over the sugar.

By reason of the hygroscopic character of the amorphous sugar solids employed as the matrix for the encapsulated flavoring oil, there is a tendency for the particulate flavoring material to agglomerate with the sugar and other ingredients constituting the balance of the beverage mix. This tendency is aggravated by attempts to suitably color the mix by the incorporation of the appropriate coloring solution onto the sugar crystals.

In accordance with the present invention a beverage composition having a suitable uniform color identifiable with the flavoring composition incorporated in the beverage mix is provided in a manner which avoids agglomeration or caking of the mix and, hence, renders it packageable and useable by the consumer in a free-flowing particulate condition such that the consumer may simply spoon out the desired level of the mix for reconstitution into the beverage form. In accordance with its specific aspects the invention calls for the preparation of a suitable food color solution and the spraying of this solution at a very minor fraction by weight of the sugar component of the mix in proportions wherein less than 500 mls. of the coloring solution is added to 1000 lbs. of sugar and mixing is continued for a sufficient period to promote a uniform incorporation of the color matter into the individual sugar crystals (typically, sucrose) so that the crystals have the desired color and the greater part of their surface is uniformly impregnated with the coloring matter.

The use of such low proportions of coloring solution to sugar is a critical feature of the present invention. It has been found that low proportions of coloring solution are sufficient to dissolve the surface portions of the sugar crystals without dissolving the bulk of the sugar crystal. With continued mixing the coloring solution containing this dissolved surface sugar loses moisture (since the moisture present in the coloring solution is above the equilibrium moisture of sucrose—about 0.1%—the sucrose tends to return to equilibrium by losing moisture). As a result of this moisture loss, sugar and coloring matter are deposited on undissolved sugar crystals, thereby forming a sugar crystal containing coloring matter as an integral portion of the sugar crystal. If a more intense color is desired, an additional quantity of coloring solution, in the same proportion to sugar as specified above, may be applied to the already colored sugar crystals. The use of the low proportions of coloring solution to sugar specified herein provides a uniformly colored product and eliminates the necessity of a drying step.

A minor quantity of a desiccating agent, for example, powdered tricalcium phosphate or magnesium carbonate, or mixtures of these agents, is added at a point during incorporation of the coloring matter into the individual sugar particles. As is more specifically described hereinafter, the coloring solution is sprayed onto the sugar particles over a period of time and the latter are continuously tumbled or otherwise agitated so as to uniformly distribute the coloring matter in the outer layers of the sugar crystals to provide a uniform color in gross appearance. This coloring solution will usually be applied at a level which, despite continued and prolonged agitation, will not cause the colored sugar particles to lose their tendency to agglomerate or aggregate. Distribution of the coloring solution is continued for a time such as will provide the aforementioned gross optical appearance of uniformity when the sugar particles are ultimately dried to a stable free-flowing form. The powdered desiccating agents are added at a suitable level to the sugar after the coloring solution has been substantially distributed over the sugar particles but prior to termination of the incorporating operation. As a result of the tumbling or other such agitation that is continued, the desiccating agent will accelerate the dehydration of the coloring solution and be thereby "set" in place on the sugar particles in such a manner that the desiccating agent is per se uniformly distributed throughout the sugar constituents and adhered thereto, whereby such desiccating agents also are not grossly detectable or liable to segregate in the final packaged product of commerce. Advantageously, by virtue of the uniform distribution of the powdered desiccating agent on the thusly color-fixed sugar particles, the aforementioned solidified matrix of flavor oil in amorphous sugar solids is less likely to undergo agglomoration with the sugar particles. As a result a dry powdered fruit-flavored beverage composition of a character which can be uniformly poured or spooned from a jar or other suitable container is assured. Advantageously, also, other beverage agents of the type described in the aforesaid U.S. Patent No. 3,023,106 to Common are similarly protected against moisture pickup; i.e., edible acidic substances like citric, tartaric, adipic, fumaric and like food acids, as well as their acid salts; and hydroscopic clouding agents in the form of a dry emulsion of a major proportion of a hydrophilic colloid like gum Arabic and a minor proportion of a plastic fat discretely dispersed throughout. Thereafter, the thusly color-containing sugar is blended with the solidified particulate emulsion of flavoring oil in the matrix of amorphous corn syrup solids under conditions of low relative humidity and low temperature whereby the colored sugar and the particulate flavoring materials are blended to be uniform in gross appearance. It is a feature of the present invention that the moisture content of the particulate flavor oil-fixed powderous material should have a moisture content of less than about 3% and, preferably, as low as about 2%, whereby the overall moisture content of the beverage composition is less than about 0.3% and generally in the range of from about 0.2% to about 0.3%. In this manner a suitable free-flowing beverage composition is provided wherein the particulate flavor oil-fixed material is rendered discretely located with respect to the colored sugar crystals and does not undergo any material agglomeration with the colored sugar or contribute to a significant reduction in flowability thereof despite the relatively hygroscopic nature of the amorphous encapsulating sugars employed. Thus, in accordance with its more preferred aspects the invention involves separately treating sugar such as sucrose or other relatively desirable and soluble mono- and poly-saccharide flavoring material constituting a major percentage by weight of the beverage composition with less than 500 mls. of color solution per 1,000 lbs. of sugar; tumbling the discrete sugar particles until they have been substantially uniformly colored with the food dye solution and are themselves free-flowing by virtue of the addition of desiccant (e.g., tricalcium phosphate); preparing a solidified emulsion of a flavoring oil in a matrix of amorphous microcrystalline sugar solids in a manner typified by the teachings of the aforesaid Swisher patent, then combining the colored sugar and the particulate oil-fixed flavoring composition in an air conditioned atmosphere having a relative humidity less than 40% and generally in the range of 30% to 40% at a dry bulb temperature in the neighborhood of less than 80° F. and, preferably, less than 75° F. until a sufficiently heterogeneous blend of the particles is produced, care being exercised to avoid the creation or introduction of heat incident to intermixing such as will give rise to softening or plasticity in the amorphous sugar solids, and then packaging the mixture of discrete particles at a relative humidity of less than 40% and in the range of 30% to 40% typically, under sufficiently hermetic packaging conditions so as to preserve the aforesaid product moisture range.

It is contemplated within the spirit of the present invention that other agents which are capable of endowing the beverage mix composition with either desired nutrition or fruit-like beverage appearance may be incorporated in the mix composition as taught in said U.S. Patent No. 3,023,106 to Common to provide the desired cloud and viscosity of a fruit-like beverage by employment of a gum-fixed emulsion of a plasticized fat and a readily soluble thickening colloid such as sodium carboxy methyl cellulose.

The invention will now be more fully understood by reference to the accompanying example:

EXAMPLE

A coloring solution was prepared by first blending F.D.C. colors (60% yellow No. 5 and 40% yellow No. 6) and dissolving 0.28 lb. of this color mix in 1.0 liter of water. 1775 lbs. of granulated sucrose (100% through U.S.S. No. 20 sieve and 8% maximum through U.S.S. No. 100 sieve) were added to a ribbon mixer; the sugar had a moisture content of less than 0.5%. After the sugar in the mixer had been tumbling for a few minutes the color solution was sprayed thereon at a gradual rate over a period of two minutes, mixing being continued throughout this spraying. After approximately 4½ minutes the color solution had colored a majority of the particles of granulated sugar in a thin film such that the particles provided the gross optical appearance of an orange color at which point the individual particles still had sufficient surface moisture on their surfaces so that they would agglomerate. At this point, tricalcium phosphate (TCP) having a moisture content of less than 4% and a grind particle size whereat 100% passes a U.S.S. No. 140 sieve and no more than 5% is retained on a U.S.S. No. 200 sieve was added gradually to the tumbling mass of sugar coated particles. As a result of continued tumbling the TCP was caused to stick to the sugar particles and dry the color solution fast on individual colored particles. One-half minute after addition of the TCP, approximately 1 lb. vitamin A palmitate and 10 lbs. of vitamin C (ascorbic acid) was added to the tumbling mix and shortly thereafter approximately 50 lbs. of a clouding agent of the type of the Common patent (a dried emulsion of four parts gum arabic and one part plasticized fat), 32 lbs. of a particulate emulsion of the type prepared in accordance with the procedure of Example I in the aforesaid Swisher patent U.S. Patent No. 3,041,180, 15 lbs. of trisodium citrate and 18 lbs. of sodium carboxymethyl cellulose were added to the mixer together with 112 lbs. of anhydrous citric acid; all these latter ingredients had a particle size distribution approximately equal to that of the granulated sugar. Mixing was substantially completed after about 15 minutes.

Throughout the entire mixing operation care was exercised to assure a room temperature of 70° F. and a relative humidity of 40%.

The beverage mix is adapted to be packaged in glass jars or other suitable container which is sealed against water vapor transmission. After periods of most aggravated storage conditions during which the material was subjected to elevated temperatures in excess of 110° F. at high relative humidities, the product maintained its free-flowing character and was substantially in this form throughout the period of use of the ingredients in the jar or other suitable container after being opened. The product prior to packaging had a moisture content in the neighborhood of from 0.2% to 0.3% and, although the flavoring material (that is the solidified emulsion of orange oil in the corn syrup solids) may have a moisture content as high as 3.0% but preferably in the neighborhood not less than 2.5%, the product retained its free-flowing character and was substantially free of lumps or other agglomerates. The ingredients in the mix were capable

What is claimed is:

1. A method of manufacturing a flavored and colored powderous beverage composition which comprises spraying an aqueous coloring solution onto sugar crystals, said coloring solution being added in sufficient quantity to impart a desired intensity of color to the sugar crystals, the addition of the coloring solution being done in successive batches, the level of a batch of said coloring solution relative to the level of said crystals being sufficient to dissolve only the surface portion of the sugar crystals without dissolving the bulk thereof, the amount of a batch of coloring solution to sugar crystals being in the proportion of about 500 mls. maximum of coloring solution to 1000 lbs. of sugar crystals; mixing said crystals and a batch of the coloring solution to cause the dissolved surface sugar to lose moisture and cause the coloring matter of said solution to be uniformly dispersed on the surface of said sugar crystals and affixed to said sugar crystals, said mixing being performed after the addition of each batch of coloring solution, while mixing the sugar crystals and a batch of coloring solution adding a powderous desiccating agent to said mixture and continuing said mixing to cause said agent to be deposited on the surfaces of said crystals as said solution is being thus distributed thereover; separately preparing an emulsion of flavoring oil in amorphous sugar and drying same to a moisture content of less than about 3% and grinding same to provide a powderous solidified matrix for said oil; and blending the powderous matrix and previously colored and desiccating agent—coated crystals under packaging conditions which provide a beverage composition having a reduced moisture content at which the powderous mixture is free flowing; and hermetically packaging the blend thus produced.

2. A method according to claim 1 wherein the desiccating agent is selected from the group consisting of tricalcium phosphate, magnesium carbonate and mixtures thereof.

3. A method according to claim 1 wherein said blending takes place at a relative humidity of below about 40% at a dry bulb temperature less than 80° F.

4. The hermetically packaged dry baverage composition produced by the method of claim 1.

References Cited

UNITED STATES PATENTS

| | | | |
|---|---|---|---|
| 2,809,895 | 10/1957 | Swisher | 99—140 |
| 2,868,646 | 1/1959 | Schapiro | 99—78 |
| 3,023,106 | 2/1962 | Common | 99—78 |
| 3,118,771 | 1/1964 | Albrecht | 99—143 X |
| 3,269,845 | 8/1966 | Pomeroy | 99—143 |

MAURICE W. GREENSTEIN, *Primary Examiner.*